United States Patent Office 3,809,565
Patented May 7, 1974

3,809,565
METHOD OF FORMING MICRON-SIZE, METAL-CARBIDE PARTICLE DISPERSIONS IN CARBON
Eugene M. Wewerka, Richard J. Imprescia, and Robert D. Reiswig, Los Alamos, N. Mex., assignors to the United States of America as represented by the United States Atomic Energy Commission
Filed Apr. 23, 1973, Ser. No. 353,276
Int. Cl. C04b 35/52, 35/56
U.S. Cl. 106—56
8 Claims

ABSTRACT OF THE DISCLOSURE

Dispersions of micro-size, metal-carbide particles are achieved in carbon matrices by dissolving or dispersing organometallic compounds in carbon precursor materials, e.g., thermosetting resins and coal tar pitch, and subjecting the mixture to a high temperature heat treatment.

BACKGROUND OF THE INVENTION

The invention described herein was made in the course of, or under, a contract with the U.S. Atomic Energy Commission. It relates to a method of forming uniform dispersions of fine metal carbide particles in carbonaceous matrices, and more particularly to a method in which the metal is derived from organometallic compounds.

There are numerous potential applications in the reactor and space programs for carbon materials containing dispersions of finely divided, metal carbide particles. The presence of the carbide particles in the carbon matrix enhances the thermal and electrical conductivities of the resulting material. They also have values in improving erosion resistance of a carbon or graphite. Some dispersions of this type may be useful as energy absorbers.

Carbon and graphitic materials are typically prepared by pyrolysis and high temperature heat treatment of carbon precursor materials having good coking values. Frequently, preferred precursor materials are (a) tar or pitch derived from either petroleum or coal, and (b) various thermosetting resins, e.g., condensates of furfuryl alcohol, epoxy resins, and various phenolic resins. These materials have the advantageous feature of being liquid at room temperature or within a few hundred ° C. above room temperature and are amenable to various extrusion techniques while containing a very high percentage of filler materials. Powder metallurgical techniques are readily applicable to carbon and graphitic materials derived from them.

Unfortunately, obtaining dispersions of metal carbide particles of the desired fineness, i.e., micron size, in a carbon matrix is not easily achieved using the standard methods of powder technology. Typically, these involve grinding the carbides to produce extremely fine particles which are then mixed with the carbon constituents. One problem is that fine metal carbide particles tend to agglomerate before they can be thoroughly dispersed in a carbon mixture. Furthermore, many fine metal carbide particles are pyrophoric. As a result, the grinding process used to achieve micron or submicron sizes necessarily includes the use of inert atmosphere handling procedures which are normally impractical except for the preparation of very small quantities of experimental material.

SUMMARY OF THE INVENTION

We have found that these problems may be readily overcome through the addition of the desired metal as an organometallic compound to the carbon precursor material while the carbon precursor material is still in the liquid state. It is desirable but not essential that the organometallic additives be completely soluble in the liquid carbon precursor material. Complete solubility of the additives ensures uniform blending of the metals throughout the carbon precursor material. However, even if the additive is non-soluble or only partially soluble in the liquid carbon precursor material, uniform blending may be achieved through well-known blending techniques. The mixture of additive and carbon precursor material is then heat treated to carbonize the precursor material and reduce the organometallic compound to the metal carbide. The resulting carbonaceous matrix which contains a dispersion of fine metal carbide particles may be further heat treated as desired, e.g., to enhance graphitization. This additional heat treatment may also be used to control to a certain extent the size of the metal carbide particles within the carbon matrix. The organic components of the organometallic additives are not critical to the process of this invention except insofar as they aid in making the additives soluble in the liquid carbon precursor material.

DEFINITIONS

Figure 1:
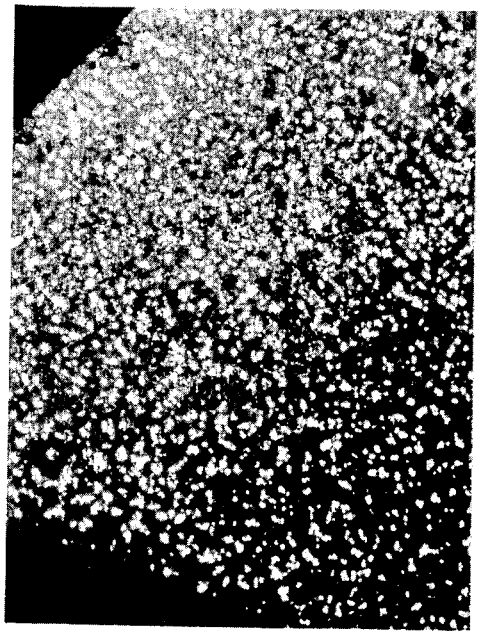
FIG. 1 is an unetched optical photomicrograph of a ZrC dispersion in a carbon derived from a mixture of 60 wt. percent zirconium acetylacetonate plus 40 wt. percent furfuryl alcohol resin heat treated to 2500° C.

As used within this application:

(1) "Curing" refers to a heat treatment, usually at temperatures of about 200° C. or less, by which thermosetting resins undergo cross linking and in some instances additional polymerization and are transformed from liquids to solids.

(2) "Pyrolysis" is a heat treatment in which a carbon precursor material is heated to well above its decomposition temperature, nearly all volatile components and volatile decomposition products are driven off, a carbon matrix is produced, and essentially all metal present in the material is transformed to the carbide.

(3) "Graphitization" is the reorganization of a carbon into a more structured material accompanied by a substantial increase in its crystallite size ($L_c$).

(4) "Fine" refers to particle sizes ranging from less than 1 μm. to several tens of microns.

DESCRIPTION OF THE PREFERRED EMBODIMENTS

The samples listed in the table were made by dispersing or dissolving either 10 or 20% by weight of organometallic compounds of Zr, V, Ta, or Ti into 10 g. samples of either a 400-centipoise furfuryl alcohol resin or a coal tar pitch and blending for 15 minutes at 70° C. Additionally, two furfuryl alcohol resin samples containing, respectively, 17 and 23% by weight of an organometallic compound of V are listed in the table. The resin base samples were cured to 200° C. in air over a 72-hr. cycle, baked to 900° C. in argon over a 24-hr. cycle, and graphitized to 2800° C. in helium over a 10-hr. cycle. With the exception of a cure, which they did not have, the pitch base samples were heat treated in a similar manner. All samples were examined by both optical and electron microscopy. Metal carbide particle size values were determined by optical and electron microscopy. In the table, the heading "Metal" refers to the weight percent of metal in relation to the weight of the combined organometallic compound and the carbon precursor material.

As shown in the table, with each precursor material the tantalum organometallic yields finer and more uniform carbide dispersions than do the other organometallics. In the pitch-derived carbon, the TaC particles are usually under 0.25 μm. in size, but they range up to 2 μm. in the resin-derived carbon. Carbide particles of the other metals are fairly evenly distributed, but are usually significantly larger than those of tantalum.

While segregative effects may serve to limit the temperatures to which in situ dispersions of carbide particles in massive carbon matrices may be heated, they may be largely overcome when the objective is to manufacture filler materials for the production of metal carbide loaded graphites. In such instances, the loaded carbons may be produced as coarse lumps requiring comminuting, e.g., grinding, to sizes which are useful for filler materials. Subsequent blending of the ground fillers into a carbon precursor material distributes the carbide particles more evenly within the eventual carbon matrix, even though in- TABLE.—FORMATION OF METAL CARBIDE PARTICLE DISPERSIONS IN CARBON MATRICES USING ORGANOMETALLIC ADDITIVES

| Carbon precursors [1] | Organometallic additives | Additive concentration (wt. percent) | | Approximate carbide particle size (μm.) | Degree of dispersion of carbide particles |
|---|---|---|---|---|---|
| | | Compound | Metal | | |
| PFA | Ti-oxyacetylacetonate | 10 | 1.8 | 4 max., most <2 | Fair. |
| | do | 20 | 3.6 | do | Do. |
| | Zr-acetylacetonate | 10 | 1.9 | do | Good. |
| | do | 20 | 3.7 | do | Do. |
| | Ta-ethoxide | 10 | 2.8 | <2 | Very good. |
| | do | 20 | 5.6 | <2 | Do. |
| 15V | do | 20 | 5.6 | Mostly <0.5 | Good. |
| | Zr-acetylacetonate | 20 | 3.7 | 4 max., most <2 | Fair. |
| | Ti-oxyacetylacetonate | 20 | 3.6 | <6 | Good. |
| | V-acetylacetonate | 20 | 2.9 | <4 | Do. |
| PFA | do | 17 | 2.5 | Mostly <2 | Do. |
| | do | 23 | 3.3 | do | Do. |

[1] PFA=furfuryl alcohol resin, 400 cp.; 15V=coal-tar pitch, Allied Chemical Co.

Figure 2:
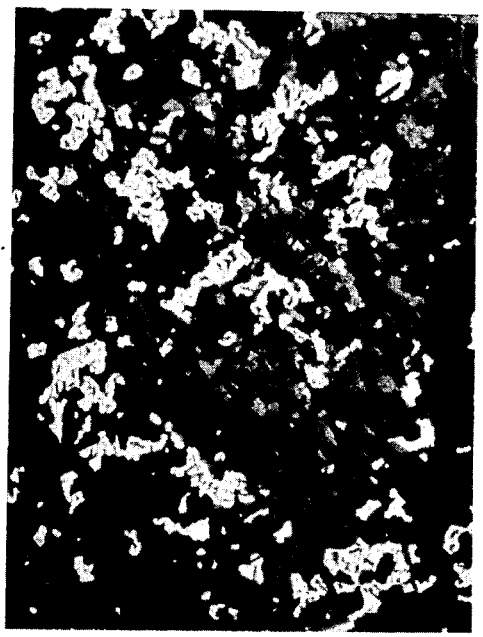
FIG. 2 is an unetched optical photomicrograph of the material of FIG. 1 heat treated to 2900° C.

Higher concentrations of dispersed carbides can be readily achieved using the methods of the invention. In addition, carbide particle sizes can be influenced by controlling the maximum heat-treatment temperature. Thus, particle sizes can be kept small by limiting the maximum heat treatment temperatures in relation to the various carbide-carbon eutectic and peritectic temperatures or increased by exceeding the eutectic and peritectic temperatures. One example of the influence of temperature on carbide particle size is shown in FIGS. 1 and 2. These figures show a ZrC dispersion in a carbon derived from a mixture of 60 wt. percent zirconium acetylacetonate in furfuryl alcohol resin heat treated to 2500° C. and 2900° C., respectively. This concentration of the organometallic yielded carbon-carbide composites containing about 43 wt. percent ZrC. In the 2500° C. sample (FIG. 1), the ZrC particles appear to be uniformly dispersed and to reach a maximum apparent size of about 2 μm. In the 2900° C. sample (FIG. 2), the particles appear to have undergone liquid-phase coalescence into particles ranging up to about 15 μm., but still appear to be fairly evenly dispersed.

Figure 3:
FIG. 3 is a xenon-ion-etched electron photomicrograph of a TaC dispersion in a carbon derived from a mixture of 20 wt. percent tantalum ethoxide plus 80 wt. percent coal tar pitch heat treated to 2800° C.
Figure 4:
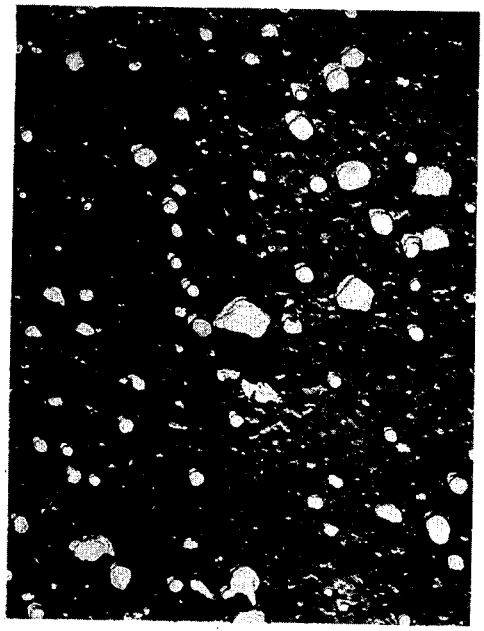
FIG. 4 is a xenon-ion-etched electron photomicrograph of the material of FIG. 3 heat treated to 2980° C.

FIGS. 3 and 4 show TaC particles in a matrix carbon derived from coal tar pitch. In each case, the original mixture consisted of 20 wt. percent tantalum ethoxide in the pitch, and the final concentrations of TaC were about 13 wt. percent. Following the 2800° C. heat treatment, the TaC particles shown in FIG. 3 were usually smaller than 0.25 μm. in apparent size and their distribution was very uniform. As indicated in FIG. 4, some growth in maximum carbide particle size occurred when the heat treatment temperature was increased to 2980° C., even though this temperature is below that at which first liquid should appear. The maximum particle size in FIG. 4 is about 0.75 μm. By way of comparison, it should be noted that FIGS. 3 and 4 are at much higher magnifications than FIGS. 1 and 2.

As a practical matter, it will be apparent that at high heat treatment temperatures which substantially exceed the eutectic and/or peritectic temperature for the particular metal carbide-carbon system, some degree of segregation of the carbide is likely to occur. Indeed, this is the case with the ZrC-C system of FIG. 2, although the segregation is not readily apparent from that figure.

dividual filler particles might not contain a uniform dispersion of metal carbide.

It is frequently advantageous to produce a uniform metal carbide dispersion in a graphite matrix. This is one reason why carbon matrices containing carbide particle dispersions are heat treated to temperatures in excess of 2300° C. Such temperatures tend to enhance graphitization of the matrix. The presence of the carbide particles in highly disordered carbon matrices also usually enhances graphitization. See, for example, U.S. patent application S.N. 262,412, entitled "Method for Enhancing the Graphitization of Amorphous Carbons Derived From Thermosetting Resins," filed June 13, 1972. This is not always the case, however. For example, coal tar pitch, on being subjected to a heat treatment cycle to 2800° C., produces a highly ordered graphitic carbon microstructure. But addition of tantalum ethoxide and subsequent heat treatment results in the alteration of the carbon microstructure from the usual streamer-like appearance to one which is nearly featureless under polarized light. Moreover, X-ray diffraction analysis shows that the crystallite size ($L_c$) is only about 80 A., instead of the usual 600 A. or more, obtained by a graphitizing heat treatment in the absence of the tantalum organometallic addition. Why this should be so is not known.

It will be apparent that the metal carbides which may be formed as dispersions in carbon matrices according to the process of this invention are not limited to those given by example herein. Rather, any metal carbide may be formed as a particulate dispersion within a carbon matrix, provided that (a) the metal is capable of forming a carbide, and (b) the resultant carbide does not decompose at the desired heat treatment temperature. Further, while it is highly advantageous for the production of very fine and uniform dispersions of metal carbide particles in carbon matrices, for the organometallic to be soluble in the liquid carbon precursor material, the process of the invention is not limited to the use of such organometallics. An organometallic that is nonsoluble or only partially soluble may still be used advantageously; however, the resultant carbide particles may be larger in size and the dispersion may be less uniform. Finally, one of ordinary skill in the art will readily understand that the amount of metal carbide particles which may be dispersed within a carbon matrix by the method of this invention may vary widely from those given by example herein.

It will be further understood that carbon precursor materials useful with the process of this invention are not limited to those given by example herein, but may be selected from those precursor materials which are liquid at temperatures between room temperature and about 400° C. and which preferably have good coking values. By coking value is meant the amount of carbon derived from a precursor material on pyrolysis. Typically, a good coking value is about 40 wt. percent or higher. A particular combination of carbon precursor material and organometallic additive is not critical except insofar as it is capable of being uniformly mixed.

What we claim is:

1. A method of producing a dispersion of fine metal-carbide particles in a carbon matrix which comprises uniformly mixing an organometallic compound with a carbon precursor material when said material is in the liquid state and subjecting the mixture to a pyrolyzing heat treatment.

2. The method of claim 1 wherein said carbon precursor material is any material having a good coking value and which is a liquid in the temperature range of room temperature to about 400° C.

3. The method of claim 2 wherein said carbon precursor material is a thermosetting resin and said resin is cured before being pyrolyzed.

4. The method of claim 2 wherein said carbon precursor material is a pitch.

5. The method of claim 1 wherein said organometallic compound is soluble in said carbon precursor material when said material is in the liquid state.

6. The method of claim 1 wherein said organometallic compound is of a metal selected from the class consisting of zirconium, vanadium, tantalum, and titanium.

7. The method of claim 1 wherein pyrolysis is followed by a graphitizing heat treatment.

8. A method of forming a filler material for use in the production of metal carbide loaded graphites which comprises uniformly mixing an organometallic compound with a carbon precursor material when said material is in the liquid state, subjecting the mixture to pyrolyzing and graphitizing heat treatments, and comminuting the resultant massive metal carbide loaded carbon matrix to particles of a desired size.

References Cited
UNITED STATES PATENTS

| | | | |
|---|---|---|---|
| 3,061,465 | 10/1962 | Norman et al. | 106—56 |
| 3,153,636 | 10/1964 | Shanta et al. | 106—56 |
| 3,374,102 | 3/1968 | Wainer et al. | 106—43 |

JAMES E. POER, Primary Examiner

U.S. Cl. X.R.

106—43, 44, 306